Nov. 10, 1942. J. S. FAGAN. 2,301,529
GAS SCRUBBER AND COOLER
Filed May 22, 1940
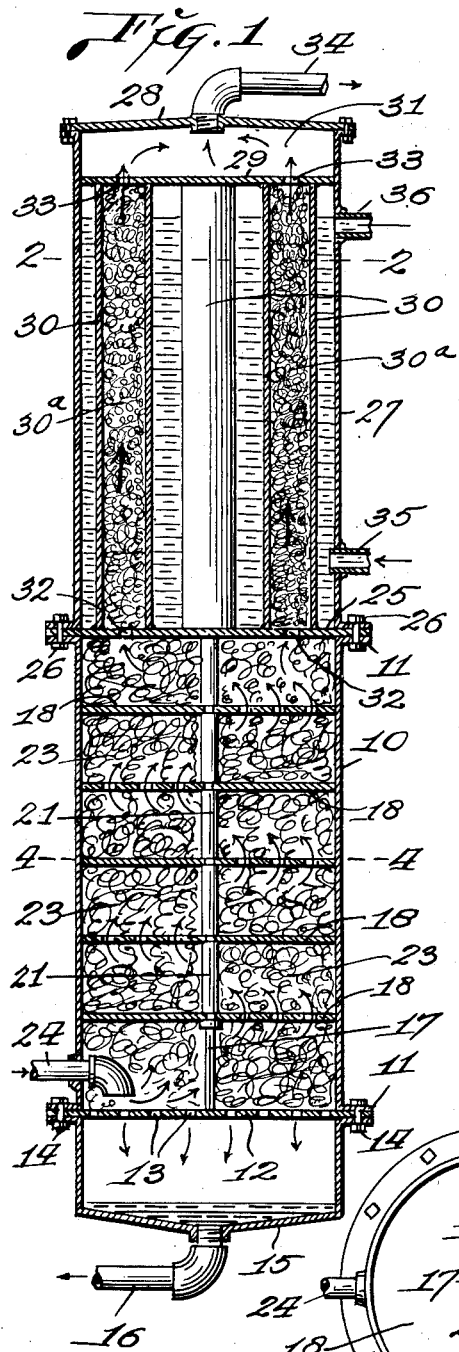
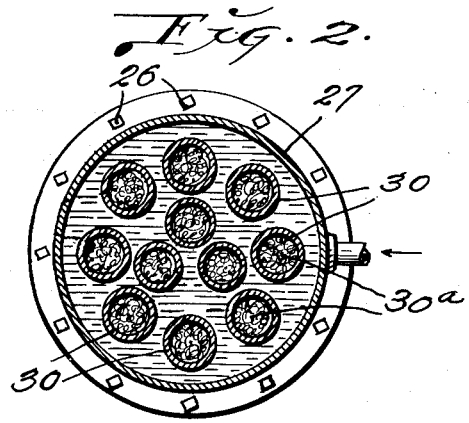
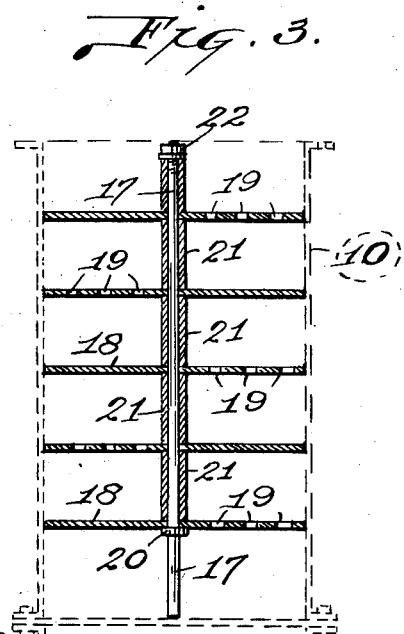
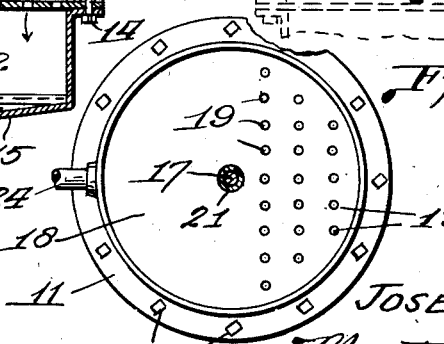
INVENTOR.
JOSEPH S. FAGAN.
BY Martin P. Smith
ATTY.

Patented Nov. 10, 1942

2,301,529

UNITED STATES PATENT OFFICE 2,301,529

GAS SCRUBBER AND COOLER

Joseph S. Fagan, Inglewood, Calif.

Application May 22, 1940, Serial No. 336,559

3 Claims. (Cl. 183—32)

My invention relates to a combined gas scrubber and cooler and has for its principal object to provide a relatively simple, practical and inexpensive apparatus that may be conveniently employed for eliminating water, creosote, soot, and like impurities from gas, said apparatus being located between the furnace or retort where the gas is produced and the holder or container for the purified gas.

Further objects of my invention are, to provide a gas scrubber containing filtering means of unitary construction so that it may be bodily removed from the housing in which it is normally positioned, in order to facilitate inspection, cleansing and repacking, further, to construct the filtering means with a series of baffle plates arranged so as to cause the gas passing through the filtering means to traverse a tortuous path, thus increasing the efficiency of filtering action and further, to combine with the filtering means a water cooled condenser through which the gas passes before being delivered to the filtered and cleansed gas holder.

With the foregoing and other objects in view, my invention consists in certain novel features of construction and arrangement of parts that will be hereinafter more fully described and claimed and illustrated in the accompanying drawing in which:

Fig. 1 is a vertical section taken through the center of a combined gas scrubber and cooler constructed in accordance with my invention.

Fig. 2 is a horizontal section taken on the line 2—2 of Fig. 1.

Fig. 3 is a vertical section taken through the center of the frame of the filter used in my improved gas scrubber and cooler.

Fig. 4 is a horizontal section taken on the line 4—4 of Fig. 1.

Referring by numerals to the accompanying drawing which illustrates a preferred embodiment of my invention, 10 designates the circular wall of a tank that contains the gas filtering means, said wall being preferably formed from suitable sheet metal and provided at its upper and lower ends with flanges 11. Positioned beneath the wall 10 against the lower flanges 11 is a plate 12 provided with perforations 13 and positioned below said plate and secured to the marginal portion thereof and to the lower flange 11 by means of bolts 14, is a short receptacle 15, the chamber within which provides a trap for the water, creosote, and other impurities that are filtered from the gas passing through the apparatus. Leading from the lower end of the receptacle 15 is a waste pipe 16.

Centrally arranged within the chamber enclosed by the circular wall 10 is a vertically disposed rod 17 and positioned thereon and disposed in spaced relation is a series of discs 18, preferably of sheet metal, the edges of which discs bear against the inner face of the wall 10. Such arrangement provides a series of chambers disposed one above the other and in order to cause the gas to traverse a tortuous path in passing upwardly through said chambers, each disc 18 is provided to one side of its center with a series of apertures 19, and the discs are arranged so that the apertured portions thereof are staggered or offset with respect to each other and which arrangement is clearly illustrated in Figs. 1 and 3.

The lowermost one of the discs 18 rests upon a shoulder or collar 20 that is formed on the lower portion of rod 17 and those discs above the lowermost one are maintained in spaced relation by means of tubes 21 that are located on the upper portion of rod 17 and the ends of which tubes bear against the members of an adjacent pair of discs. The entire series of discs and spacing tubes 21 are rigidly maintained in assembled relation by means of a nut and washer 22 that are located on the threaded upper end of rod 17.

As a result of the construction just described, the frame of the filtering means together with the fibrous filtering material that fills the spaces between the discs 18 may be bodily positioned within or removed from the chamber within the circular wall 10 and which provision greatly facilitates cleansing of the filtering means, also inspection and the repacking of same.

The chambers between the spaced discs 18 and the space between the lowermost one of said discs and the bottom plate 12 are filled with fibrous filtering material 23, for instance, steel wool, rock wool, or any other similar material that is effective in filtering gas.

Leading through the wall 10 into the chamber just above the perforated plate 12 is a pipe or conduit 24 that leads from the gas producing furnace or retort.

The marginal portion of a disc 25, preferably of sheet metal, rests on the upper one of the flanges 11 and resting upon said marginal portion and secured thereto and to the upper flange 11 by bolts 26 or otherwise, is the flanged lower end of a circular wall 27, the upper end thereof being closed by a head or plate 28.

Secured within the upper portion of the chamber within circular wall 27 is a disc 29 and arranged between the discs 25 and 29 with their ends secured thereto is a series of vertically disposed tubes 30 that are packed with fibrous filtering material 30a, for instance, steel wool, rock wool, or the like, and which has a much finer degree of porosity than the packing 23 between the plates 18.

Apertures 32 are formed through plate 25, which apertures communicate with the lower ends of the chambers in tubes 30 and similar apertures 33 are formed in disc 29 to permit the cooled gases to discharge into chamber 31. Connected to head 28 and leading from chamber 31 to the filtered and cooled gas holder is a duct 34.

The space within the circular wall 27 between discs 25 and 29 and surrounding the tubes 30 provides a circulation chamber for water that is delivered to the lower portion of said chamber by means of an inlet flow duct 35 and said water finding an outlet through a duct 36 that leads from the upper portion of said circulating chamber.

As a result of the construction just described, the gas in passing upwardly through the tubes 30 that are cooled by water circulating through the chamber within wall 27 is further filtered and purified before passing into chamber 31.

To clean the fibrous filtering bodies 30a, bolts 26 are removed from the plate 25, thus permitting the latter and the wall 27 to be removed from the lower portion of the device including the wall 10 and after removing the top plate 28, jets of cleansing fluid are discharged under pressure through the apertures 33 or 32 to pass lengthwise through the fibrous bodies 30a, thereby removing all accumulations therefrom.

After such cleansing, the fibrous bodies may be rapidly dried by discharging jets of heated air through the apertures 32 or 33.

In operation, gases from the retort or furnace are delivered by duct 24 to the chamber within the filter between the lowermost plate 18 and bottom plate 12 and after passing through the fibrous filtering body within said chamber the gas passes upwardly through the apertures in said lowermost plate 18 and from thence the gas passes through the successive chambers between the discs or plates 18, which chambers are filled with fibrous filtering material 23, which is considerably coarse than the fibrous material 30a that fills the tubes 30, and as a result of the staggered arrangement of the apertures in the plates or discs the gas must necessarily traverse a tortuous path before it discharges from the filtering portion of the apparatus through the apertures 32 into cooling tubes 30.

In passing upwardly through the fibrous filtering bodies filling the spaces between the discs 18, the greater portion of all foreign substances such as water, creosote, soot, and the like, are filtered from the gas and by gravity these foreign substances pass downwardly through the apertures 13 in plate 12 and accumulate in the receptacle 15 which serves as a sump and from which receptacle the refuse accumulations discharge through outlet pipe 16.

The filtered and cleansed gas passes upwardly through the tubes 30 which are surrounded by circulating, cooling medium, preferably water, that enters the cooling chamber through inlet pipe 35 and discharges through pipe 36 and thus, the cleansed gases are thoroughly cooled and finally discharged through apertures 33 into chamber 31 and from thence the gases pass through duct 34 to the gas holder or receptacle.

In order to achieve maximum results and efficiency of operation, I utilize fibrous filtering material in the tubes 30 that is considerably finer than the material used in the container 10 between the plates 18, and by doing so the travel of the gases upwardly through the tubes 30 is materially retarded, such action correspondingly retarding the upward flow of gases through the bodies of filtering material 23 between the plates 18. Thus the gases which are heated to a high degree as they discharge from inlet pipe 24 into the lower portion of the tank 10 are retarded in their flow upwardly through the bodies of filtering material 23 and through the perforations in plates 18, which retarded action is highly effective in bringing about a separation of the water, creosote, soot, and other impurities carried by the gas that enters the tank.

Thus the gases practically free of impurities discharge through the apertures 32 into the lower portions of the bodies of relatively fine fibrous material contained within the tubes 30 and passing upwardly therethrough at retarded speed, said gases are further cleaned of impurities as result of contact with the fine fibers and at the same time the gases are being subjected to the cooling effect of the fluid cooling medium that circulates through the tank 27.

Thus in effect the fibrous fitering bodies 30a contained within the tubes 30 in addition to effecting a final filtering of the gas passing upwardly therethrough, not only controls the flow of gas through the bodies of fibrous material 23 contained in tank 10 but retards the flow of the gases upwardly through the tubes 30 so as to give ample time for the gases to be thoroughly cooled by the circulating cooling medium before the gases pass into and through the pipe 34 that leads to the gas holder.

Among the particularly desirable features of my invention are, compactness of structure of the entire apparatus including the filtering means and the gas cooling means and further, the unitary construction of the frame of the filter, which enables said frame to be readily removed from the cylinder 10 in order to permit the ready cleansing or renewal of the fibrous material that fills the spaces between the discs 18.

Thus it will be seen that I have provided a combined gas scrubber and cooler that is relatively simple in construction, inexpensive of manufacture and very effective in performing the functions for which it is intended.

It will be understood that minor changes in the size, form and construction of the various parts of my improved gas scrubber and cooler, may be made and substituted for those herein shown and described, without departing from the spirit of my invention, the scope of which is set forth in the appended claims.

I claim as my invention:

1. A gas scrubber and cooler comprising a chamber having a gas inlet and a gas outlet, a body of relatively coarse, gas filtering means within said chamber, means for causing the gas to traverse a tortuous path in passing through said filtering means, a sump below said chamber for receiving the waste materials filtered from the gas passing upwardly through said chamber, a series of tubes surmounting the filtering chamber for receiving the gas as it discharges from said filtering chamber, bodies of relatively fine fibrous filtering material within said tubes, which bodies of fine fibrous material retard the flow of gas upwardly through said tubes and correspondingly retarding the flow of gas through said body of relatively coarse filtering material and means for circulating a fluid cooling medium around said tubes.

2. A gas scrubber and cooler as set forth in claim 1, with means for receiving and confining the cooled gases that discharge from the upper ends of said tubes.

3. In a gas scrubber and cooler, a chamber having a gas inlet and a plurality of gas outlets, a body of relatively coarse, filtering material within said chamber, means for causing gas to travel a tortuous path in passing through said filtering means, a housing disposed above said chamber, tubes within said housing, the lower ends of which tubes communicate with the gas outlets from the lower chamber and bodies of relatively fine, filtering material filling said tubes so as to retard the flow of gases through said tubes and correspondingly retarding the flow of gas through said body of relatively coarse filtering material and means for circulating a fluid cooling medium around said tubes.

JOSEPH S. FAGAN.